United States Patent
Krishnasamy et al.

(10) Patent No.: US 10,379,882 B2
(45) Date of Patent: Aug. 13, 2019

(54) SYSTEMS AND METHODS FOR LOCALIZING A USER INTERFACE BASED ON A PERSONAL DEVICE OF A USER

(71) Applicant: XEROX CORPORATION, Norwalk, CT (US)

(72) Inventors: Muralidaran Krishnasamy, Chennai (IN); Raj Kumar, Chennai (IN); Narayan Kesavan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 89 days.

(21) Appl. No.: 15/593,350

(22) Filed: May 12, 2017

(65) Prior Publication Data
US 2018/0329615 A1    Nov. 15, 2018

(51) Int. Cl.
*G06F 9/451* (2018.01)
*G06F 3/0481* (2013.01)

(52) U.S. Cl.
CPC ............ *G06F 9/454* (2018.02); *G06F 3/0481* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,826,081 | B2* | 11/2010 | Stevens | G06F 21/41 358/1.15 |
| 8,244,712 | B2* | 8/2012 | Serlet | G06F 16/173 707/713 |
| 9,332,076 | B2 | 5/2016 | Migdalovich et al. | |
| 9,858,258 | B1* | 1/2018 | Pasquini | G06F 17/2252 |
| 2004/0012628 | A1* | 1/2004 | Kropf | G06F 9/451 715/744 |
| 2004/0113941 | A1* | 6/2004 | Sliwa | G06F 9/451 715/744 |
| 2005/0057560 | A1* | 3/2005 | Bibr | G06F 8/65 345/418 |
| 2009/0276206 | A1* | 11/2009 | Fitzpatrick | G06F 9/454 704/2 |
| 2011/0119676 | A1* | 5/2011 | Gallant | G06F 9/454 718/104 |
| 2011/0209047 | A1* | 8/2011 | Olsen | G06F 17/2247 715/234 |
| 2013/0007608 | A1* | 1/2013 | Li | G06F 3/1454 715/265 |
| 2013/0067366 | A1* | 3/2013 | Almosnino | G06F 3/0483 715/764 |

(Continued)

*Primary Examiner* — Hien L Duong

(57) ABSTRACT

The disclosure discloses methods and systems for localizing a user interface based on a personal device of a user. The method includes receiving a personal device by a multi-function device, the personal device stores one or more documents, the personal device is associated with a name and each document is associated with a name, wherein the name of the personal device and the name of each document indicate a local language of the user. Upon receiving, the personal device is detected by the multi-function device. Then, the name of the personal device and the name of each document are extracted and compared with one or more pre-stored language patterns to detect the local language of the user. Upon detection, the pre-defined language of the user interface is automatically changed to the local language of the user.

21 Claims, 10 Drawing Sheets

(56) References Cited

U.S. PATENT DOCUMENTS

| | | | |
|---|---|---|---|
| 2013/0326348 A1* | 12/2013 | Ip | G06F 17/214 |
| | | | 715/269 |
| 2014/0123039 A1* | 5/2014 | Ozer | G06F 9/454 |
| | | | 715/762 |
| 2014/0201187 A1* | 7/2014 | Larson | G06F 17/30398 |
| | | | 707/711 |
| 2016/0100070 A1* | 4/2016 | Nauta | G06F 9/454 |
| | | | 704/8 |
| 2017/0116184 A1* | 4/2017 | Bradley | G06F 17/289 |

* cited by examiner

| Spanish | English | |
|---|---|---|
| la officina | office | 410 |
| la ciudad | city | |
| la renta | the rent | 412 |
| el impuesto | tax | |
| la cuesta | the cost | 414 |
| el précio | price | |
| la cuenta | bill | |
| la estimación | estimate | 416 |
| el cheque | check | |
| el cheque de viajr | travelers check | 418 |
| el passaporte | passport | 420 |
| el equipaje | luggage/baggage | |
| el intercambio de modernidad | currency exchange | |
| las aduanas | customs | |
| la entrada | entrance | |
| el salido | exit | |

400 (table), 402, 404, 406, 408 (row labels on left)

*FIG. 4*

SYSTEMS AND METHODS FOR LOCALIZING A USER INTERFACE BASED ON A PERSONAL DEVICE OF A USER

TECHNICAL FIELD

The presently disclosed embodiments are directed to the field of multi-function devices, and more particularly to systems and methods for localizing a user interface based on a personal device or a storage device of a user.

BACKGROUND

Business devices such as a multi-function device, a photocopier machine, a scanning device, etc., allow users to perform various functions like printing, copying or scanning. With the advancement of technology, it has become a common practice in the consumer goods (or appliances) industries to configure languages in such devices/products based on geography or location where these devices are distributed, sold and/or operated. For example, if a consumer appliance (e.g., photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices but it becomes difficult for other users (users who don't understand or know Japanese language) to operate the same devices. For example, a person from United States of America goes to a particular location in Japan, where all devices are configured in a native language of Japan and wishes to operate a scanning device. Here, the user may not be able to operate the device because he does not understand or is not well versed with the Japanese language. In such a scenario, the user has to rely on local users of that particular location (or individuals) who can easily understand the Japanese language, i.e., the language configured in such devices.

At times, the business devices are configured with English language since it is the often language that people attempt to speak or read but still some users may not understand it properly, hence may not be able to operate these devices. Some solutions are available to change the language of the devices. For example, manufacturers provide options to select one or more preferred languages to operate the device, however, those options involve knowing the device by reading through manuals (e.g., booklet, or digital manuals), and manually select the preferred language and then operate the device. The manual selection of the preferred language(s) by users may result in errors or may lead to discomfort to users and thus is not a desirable option. Moreover, the manual selection seems a time consuming activity. Also, if the device is already in a different language say, Japanese, then it is difficult to go till menu and change the language as the user does not understand the current language of the device. Other solutions include changing the language via voice feedback but it becomes difficult if a person is disabled or if the accent of the person is not very clear. In such cases, the voice feedback may not be helpful. In view of the above, there is a need for methods and systems to enable users to operate such devices with ease, for example, in their respective local language.

SUMMARY

According to aspects illustrated herein, there is provided a method for localizing a user interface of a multi-function device, based on a personal device of a user connected to the multi-function device. The multi-function device presents a user interface in a pre-defined language. The method includes receiving the personal device by the multi-function device, the personal device stores one or more documents, the personal device is associated with a name and each document is associated with a name, wherein the name of the personal device and the name of each document indicate a local language of the user. Upon receiving, the personal device is detected by the multi-function device. The name of the personal device and the name of each document is extracted. The extracted name of the personal device and the extracted name of each document are compared with one or more pre-stored language patterns to detect the local language of the user. Upon detection, the pre-defined language of the user interface is automatically changed to the local language of the user.

According to other aspects illustrated here, a method is disclosed. The method includes receiving a storage device by a multi-function device, wherein the multi-function device presents a user interface in a pre-defined language of the multi-function device. The storage device is detected by the multi-function device, the storage device includes one or more documents, wherein the storage device and each document are associated with a respective name, wherein the name of the storage device and the name of each document are in a local language of a user. The name of the storage device and the name of each document are extracted. The name of the storage device and the name of each document are analyzed to detect the local language of the user using a language model. Then, the pre-defined language is changed to the local language of the user. Finally, content of the storage device is displayed when the pre-defined language is changed to the local language of the user. Thereafter, the user interface is presented in the local language of the user to perform one or more functions.

A multi-function device includes a user interface, a language database, a peripheral port and a language detection module. The user interface is configured for presenting one or more options in a pre-defined language of the multi-function device. The language database is configured for storing one or more patterns in one or more languages and storing one or more local languages. The peripheral port is configured for receiving a storage device of a user, the storage device is associated with a name, wherein the storage device includes one or more documents, wherein each document is associated with a name, wherein the name of the storage device and the name of each document are in a local language of a user. The language detection module is configured for detecting the storage device; extracting the name of the storage device and the name of each document, to detect the local language of the user; and upon extraction, automatically changing the user interface from the pre-defined language to the local language of the user.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 4, 5, 6, 7A-7B, 8, and 9A-9B show screenshots according to exemplary embodiments of the disclosure.

DESCRIPTION

Figure 1:
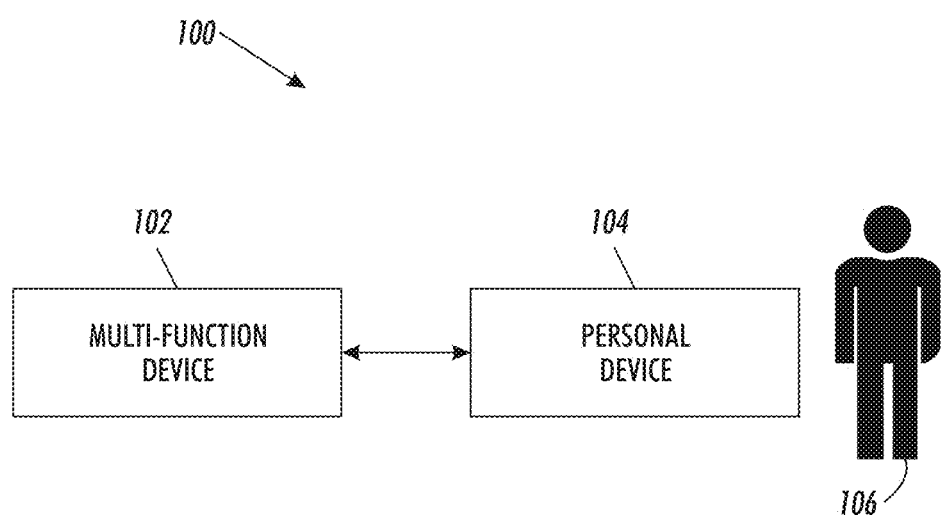
FIG. 1 is an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured with a pre-defined language based on geography or a location where the device is sold or distributed. In the context of the current disclosure, the multi-function device is configured to detect one or more local languages based on a personal device and accordingly change the pre-defined language of the multi-function device. The multi-function device may include a number of components to perform the said functionality.

The "pre-defined language" is the language which the multi-function device is configured to operate, at the time of manufacturing. The pre-defined language is also called as a default language or a pre-configured language of the multi-function device. For example, the pre-defined language of the multi-function device may be, but not limited to, English. The pre-defined language is dependent on geography or location where the multi-function device is sold or distributed.

The term "local language" refers to the language which is understood or known to the user, who wishes to operate the multi-function device. Further, the local language is determined based on the personal device of the user. The local language may also be termed as the native language of the user.

The term "user interface" is defined to include an interface shown on the multi-function device and is operable by the user to perform one or more functions such as change setting, check status, initiate scan, fax, print, copy, or any other functions. Here, the user interface presents an option to the user to change the pre-defined language of the user interface to the local language.

The term "personal device" of the user refers to any storage device that the user typically carries for storing data such as documents or any other type of data. Few non-limiting examples of the personal device may include but not limited to, a Universal Serial Bus (USB) drive, a hard disk, a CD, a mobile device, a personal digital assistant (PDA), a tablet, a laptop, or other forms of personal device. Further, the personal device is associated with a name in the local language of the user. Similarly, each document is associated with a name in the local language of the user. The personal device may interchangeably be used with the term "storage device" or "personal storage device."

The term "server" refers to any entity or a computing device capable of communicating with the multi-function device and further configured for identifying the local language of the user.

Overview

Typically business devices such as multi-function devices are manufactured such that the devices overall provide same kind of functionality to all users. But due to different languages adopted across the world, the manufacturers configure these devices in a language specific to a region, where these devices are sold or distributed. Most of the people are able to operate the device in a default language but some people (outside users or other users) may not be comfortable to operate the multi-function device in the default language. In order to enable users to operate the multi-function device according to their comfort or languages known to them, the present disclosure is provided. The present disclosure provides methods and systems for localizing a user interface of a device, for example, a multi-function device. The localization is performed based on a personal device of the user. When the personal device is connected to the multi-function device, the multi-function device takes cue from the personal device and automatically changes the pre-defined language to the local language of the user.

Exemplary Environment

FIG. 1 is an exemplary environment 100 in which various embodiments of the disclosure can be practiced. References to other figures, such as FIG. 2 or FIG. 3, may be made while discussing FIG. 1. The environment 100 includes a business device such as a multi-function device 102, a personal device 104 and a user 106. The personal device 104 is connected to the multi-function device 102 via a peripheral port such as a USB port but other ports/means for connecting the personal device 104 may be used. Various examples of the personal device 104 of the user 106 may include but not limited to, a pen drive, a hard disk, a CD, a mobile phone, or a combination thereof. The user 106 operates or uses the multi-function device 102 for his day-to-day tasks such as printing, copying, imaging, scanning, or a combination of these. And the user 106 further carries the personal device 104 for storing his data such as documents, or any other kind of data such as videos, audios, or a combination thereof. For understanding purposes, documents will be considered for the discussion of the current disclosure, but the disclosure may be implemented for other types of data as well.

The personal device 104 stores one or more documents of the user 106 such as forms, identity proof, address proof, or the like for printing. Each document is associated with a name. For example, a document may have a name "office data," while the other document may have a name "patent drafting file." The documents are named in a local language of the user 106 (i.e., the language that the user 106 understands). The personal device 104 is the device which is associated with a default name given at the time of manufacturing. For example, if the personal device 104 is a pen drive of HP, the name may be "HP drive." The name of the personal device 104 is in the local language of the user 106. The user 106 can change the name of the device of his choice in his local language. Further, the personal device 104 is geography dependent. For example, if the device is manufactured in Japan, then the default name is in Japanese language. In another example, if the device is manufactured in the United States then the default name is in English.

At the time of printing, the user 106 connects the personal device 104 to the multi-function device 102. The multi-function device 102 identifies the personal device 104 and upon identification, the multi-function device 102 extracts the name of the personal device 104 and the name of each document in the personal device 104. The multi-function device 102 then detects the local language of the user 106 from the extracted names/information and automatically changes the pre-defined language to the local language of the user 106. As a result, all pre-defined options are now shown in the local language of the user 106. The user 106 can now easily use or operate the multi-function device 102.

Figure 2:
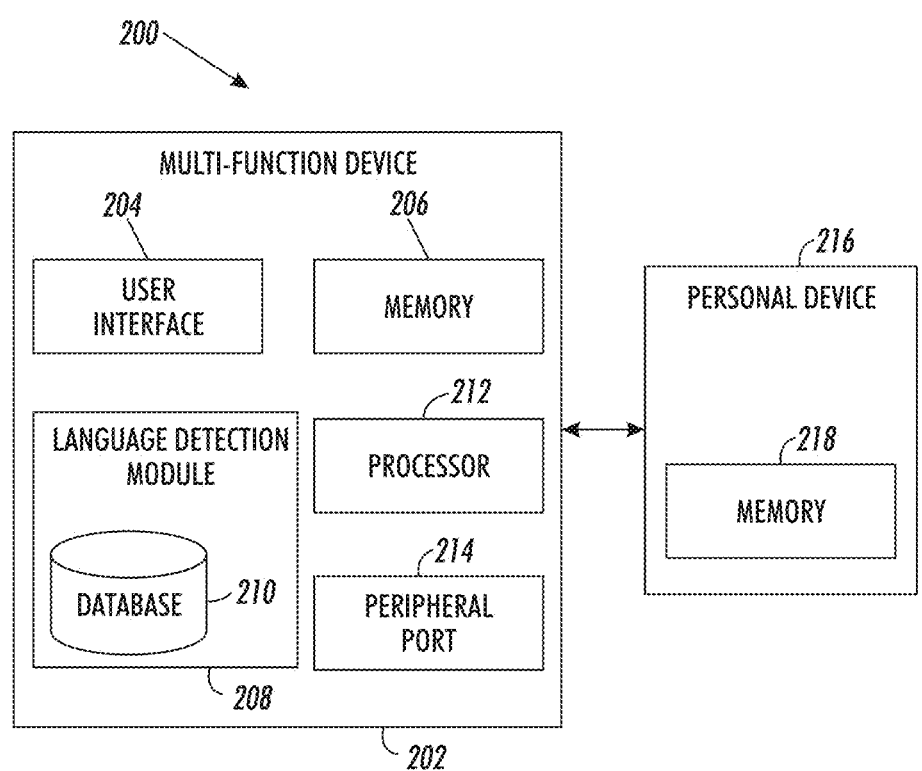
FIG. 2 is an overall system for localizing a user interface of a multi-function device.

FIG. 2 shows an overall system 200 for localizing a user interface. References to other figures such as FIG. 1 or FIG. 3 can be made while discussing FIG. 2. The system 200 includes a multi-function device 202 and a personal device 216 of a user. The multi-function device 202 includes a user interface 204, a memory 206, a language detection module 208, a database 210, a processor 212 and a peripheral port 214. The personal device 216 of the user includes a memory 218. Each of the components 204, 206, 208, 210, 212 and 214 are coupled to each other via a communication bus or later developed protocols and also each of the components communicate with each other for localizing the user interface 204 of the multi-function device 202. The multi-function device 202 may include one or more additional components as required to implement the current disclosure. The personal device 216 of the user is communicatively coupled to the multi-function device 202 via the peripheral port 214 of the multi-function device 202.

As shown, the database 210 stores one or more patterns related to various languages such as English, Japanese, Chinese, French, Spanish or the like. Along with this, the database 210 stores one or more local languages. The database 210 may also include a sentence pattern database. Few examples of patterns in the Spanish and English language are shown in table 400 of FIG. 4. One or more patterns in the language Spanish are marked as 402, 404, 406, 408, and so on. Similarly, a few patterns in the language English are marked as 410, 412, 414, 416, 418, and 420. There can be more examples to it but for understanding a few examples are cited in the table 400.

The database 210 may contain pre-stored sentence patterns or sentences of languages (e.g., English, Spanish, and German). As these languages are built with similar alphabets, language detection can be done only post verification of words/sentences. The database 210 may contain languages (e.g., Chinese, Arabic, etc.) with unique alphabets and the language can be detected instantly based on one of the alphabet in the drive label/name of the personal device 216.

In some embodiments, a language model is available with the multi-function device 202 that enables the multi-function device 202 to be provided with language detection facilities. The language models are known in the art or can be customized as per the current disclosure to identify the local language.

By default, the multi-function device 202 is configured to operate in a pre-defined language. The pre-defined language is based on geography where the multi-function device 202 is distributed or sold. For example, if there is a multi-function device 202 in the United States, the multi-function device 202 is operable in the language English. In another example, if the multi-function device 202 is sold in Japan, the multi-function device 202 is operable in Japanese language. The multi-function device 202 presents the user interface 204 in the pre-defined language or the default language to the user. The user interface 204 displays one or more options to the user for operating the multi-function device 202. The one or more options may relate to printing, scanning, change settings, initiate scan, or the like.

Initially, the user who wishes to use the multi-function device 202 connects the personal device 216 to the multi-function device 202 via the peripheral port 214. For example, the user inserts the pen drive in the USB port of the device 202. The multi-function device 202 receives the personal device 216 and detects the personal device 216 upon connection.

The processor 212 triggers the language detection module 208 for localizing the user interface 204 of the multi-function device 202. The language detection module 208 checks whether the personal device 216 is assigned with any name and checks for one or more documents in the personal device 216 of the user. The language detection module 208 checks the name given to the personal device 216 and also names of one or more documents stored in the personal device 216. The language detection module 208 further extracts the name of the personal device 216 and the name of each document stored in the personal device 216 or the memory 218 of the personal device 216.

Figure 5:
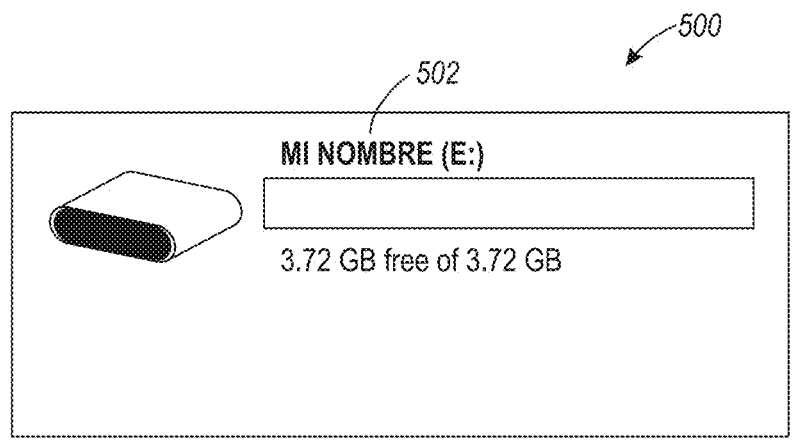
Figure 6:
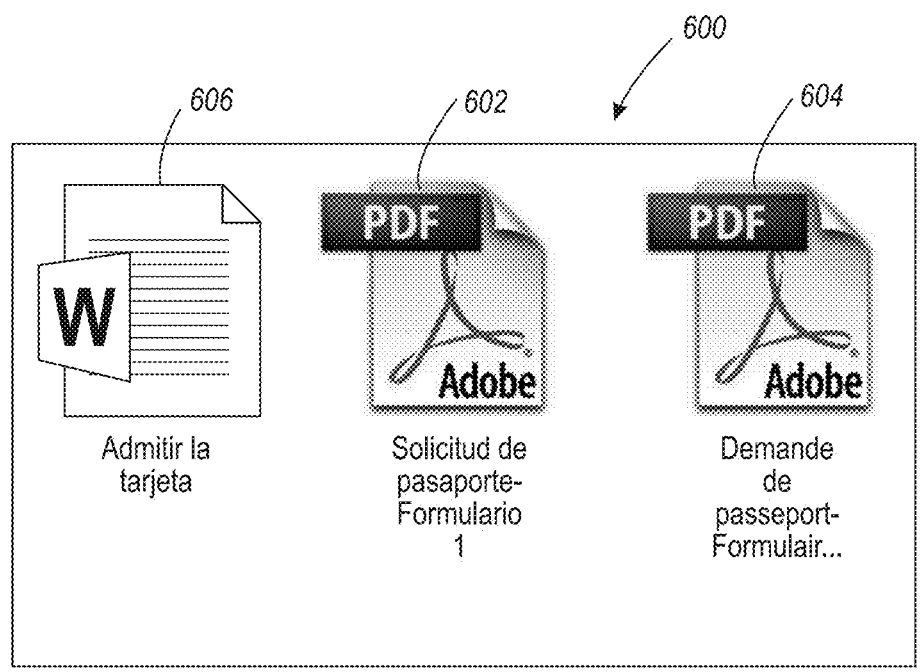

As shown in the snapshot 500 of FIG. 5 the personal device 216 is assigned a name "MI NOMBRE," as indicated by 502. The name 502 is assigned in the Spanish language. Similarly, the snapshot 600 of FIG. 6 shows that the personal device 216 includes different documents where 2 documents marked as 602 and 604 are in the Spanish language, while the document 606 in French. In particular, the documents 602 and 604 have their names in the Spanish language, while the name of the document is in the French language.

The language detection module 208 parses the extracted names/information to identify the local language of the user. To this end, the language detection module 208 compares the extracted names against one or more patterns as stored in the database 210. In case of any ambiguous language, the entire sentence is compared with the pre-stored patterns. The language detection module 208 may use one or more language models to identify the local language. Upon suitable match, the language detection module 208 identifies the local language of the user. The language detection module 208 then checks the availability of the local language with the multi-function device 202. The language detection module 208 then retrieves the identified local language from the database 210 or the memory 206. The identified language is then installed on the multi-function device 202 and in this manner, the multi-function device 202 is configured with the local language of the user. The language detection module 208 automatically changes the pre-defined language to the local language of the user.

As a result, all pre-defined options are then displayed in the local language of the user. For example, if the identified local language is English, then all menu options displayed earlier in Japanese are now displayed in English language. The user is now able to operate the multi-function device 202 in the local language.

Figure 7A:
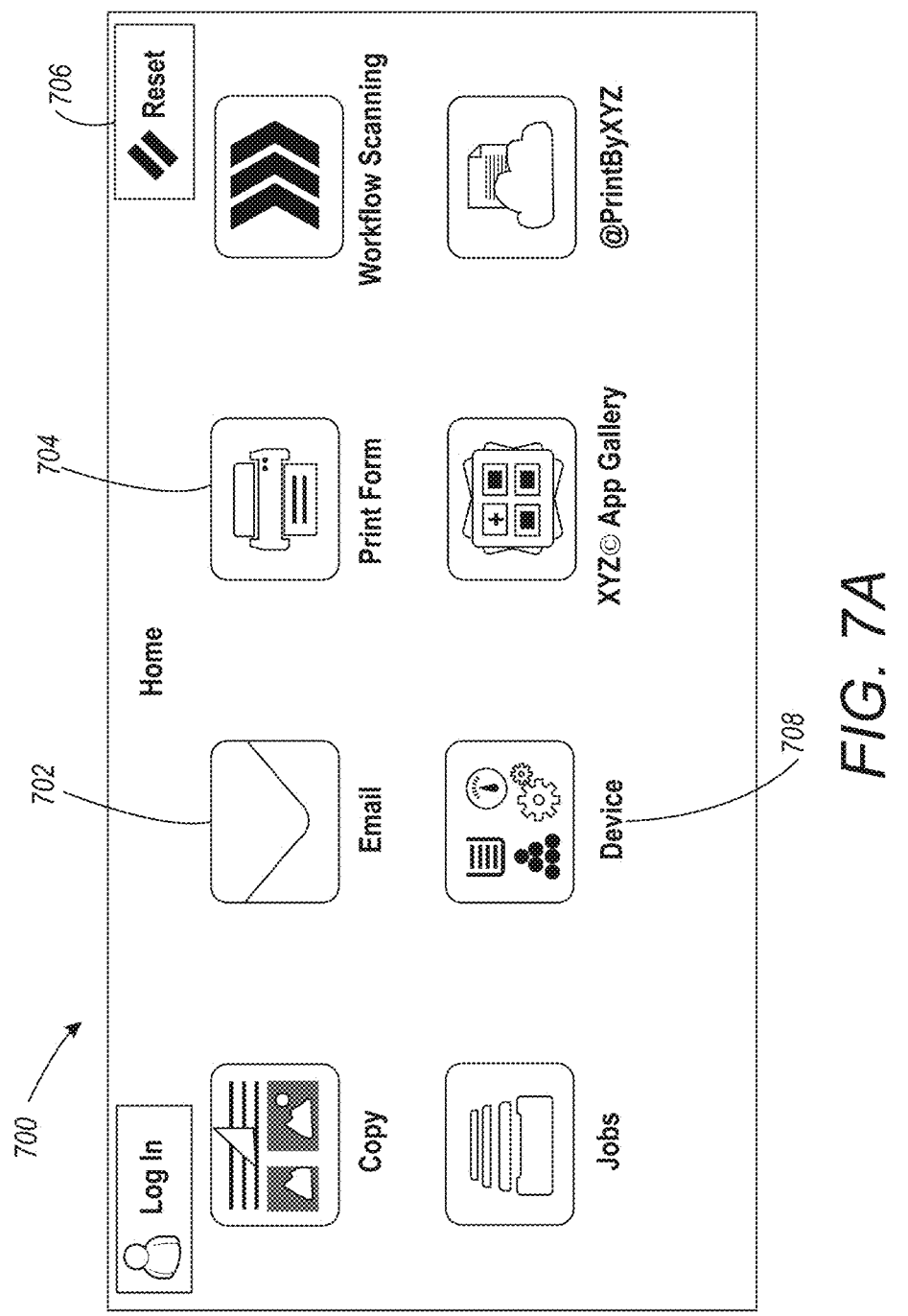
Figure 7B:
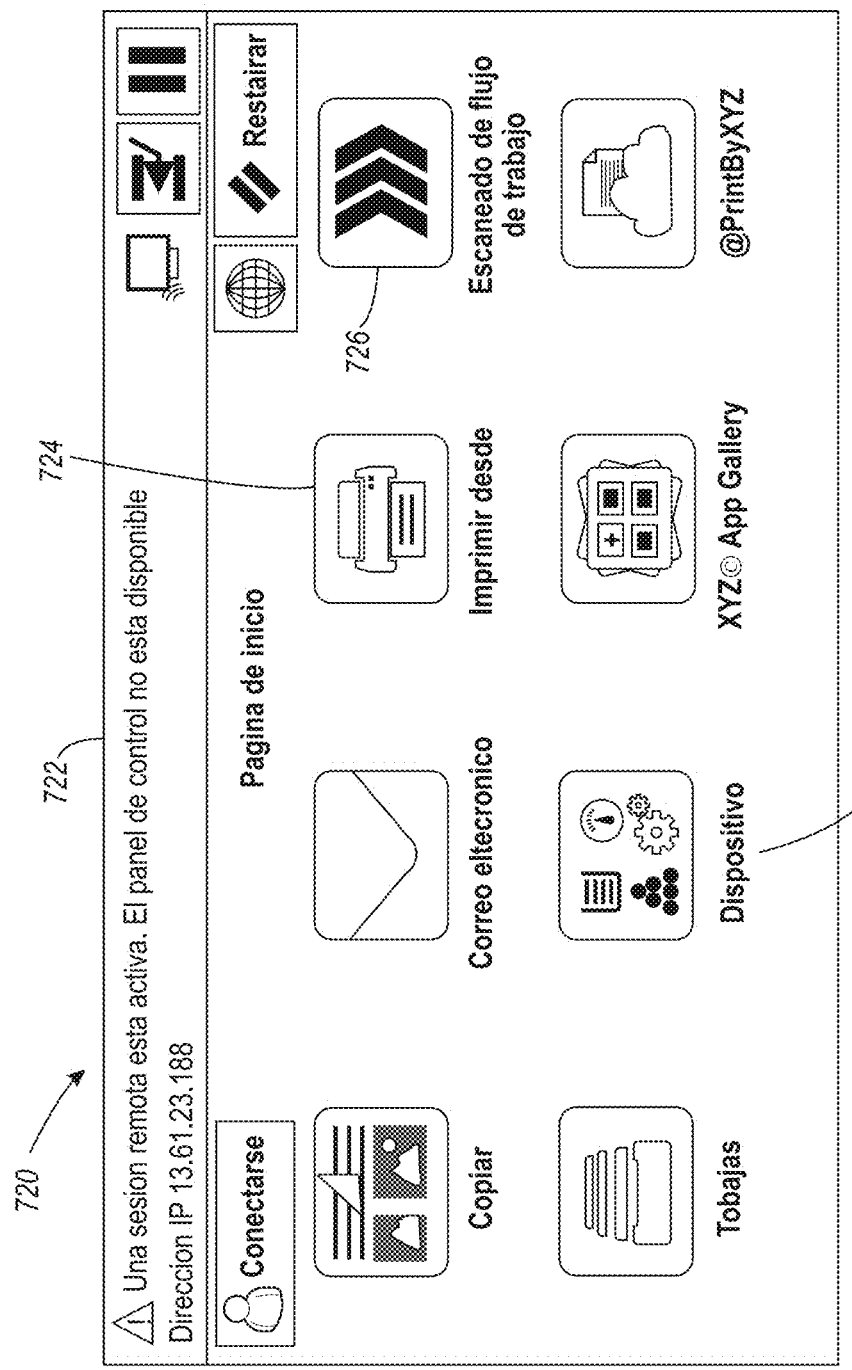

For better understanding, an example is shown in FIGS. 7A and 7B. FIG. 7A shows a snapshot 700 of the multi-function device 202, where services are listed in the default language, for example, English in this case. The services and other options such as 702, 704, 706 and 708 are displayed in the English language. Upon detection of the local language, the services options are shown in the local language. For example, in the snapshot 720 of FIG. 7B, all menu options such as 722, 724, 726 and 728 are displayed in the Spanish language. Using these Spanish, the user can comfortably use the multi-function device 202.

Figure 9A:
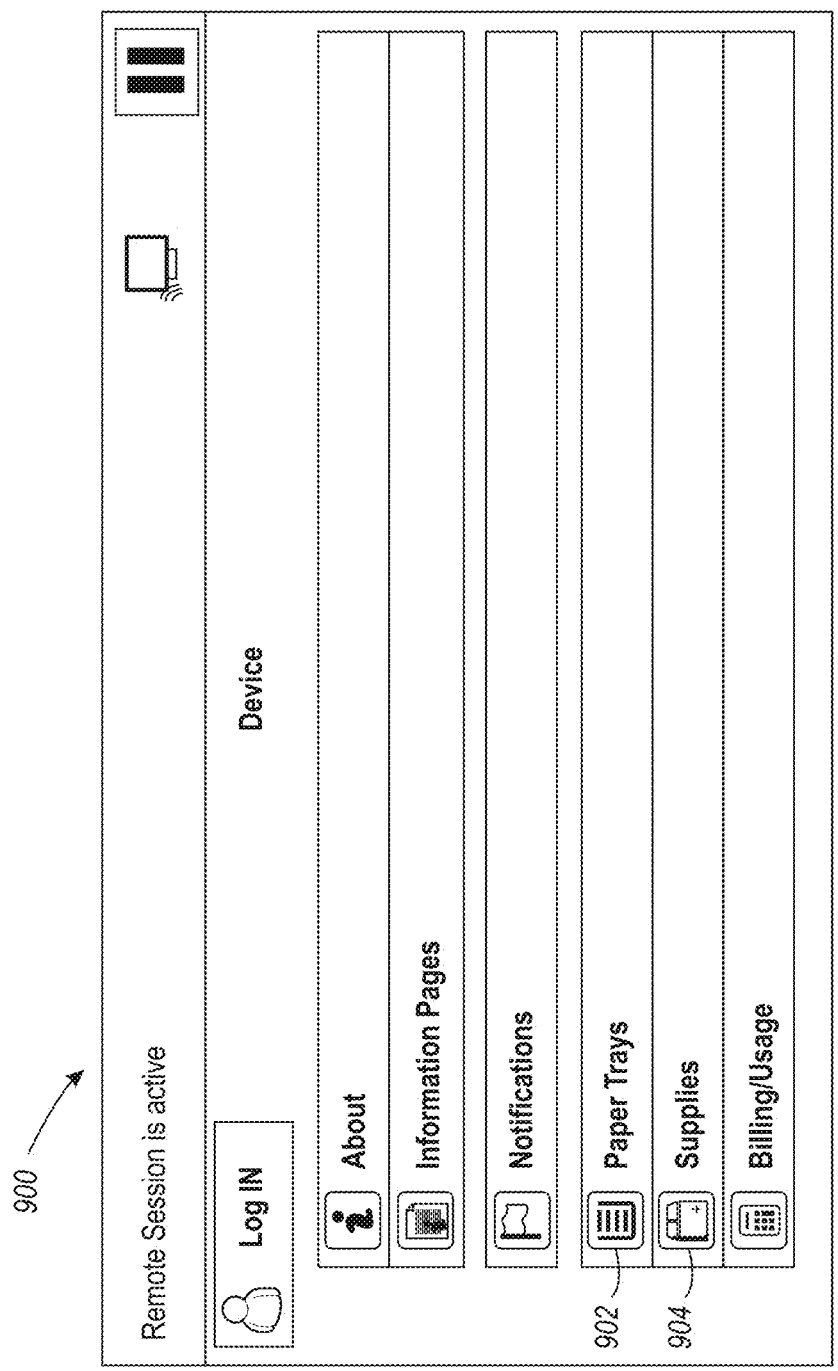
Figure 9B:
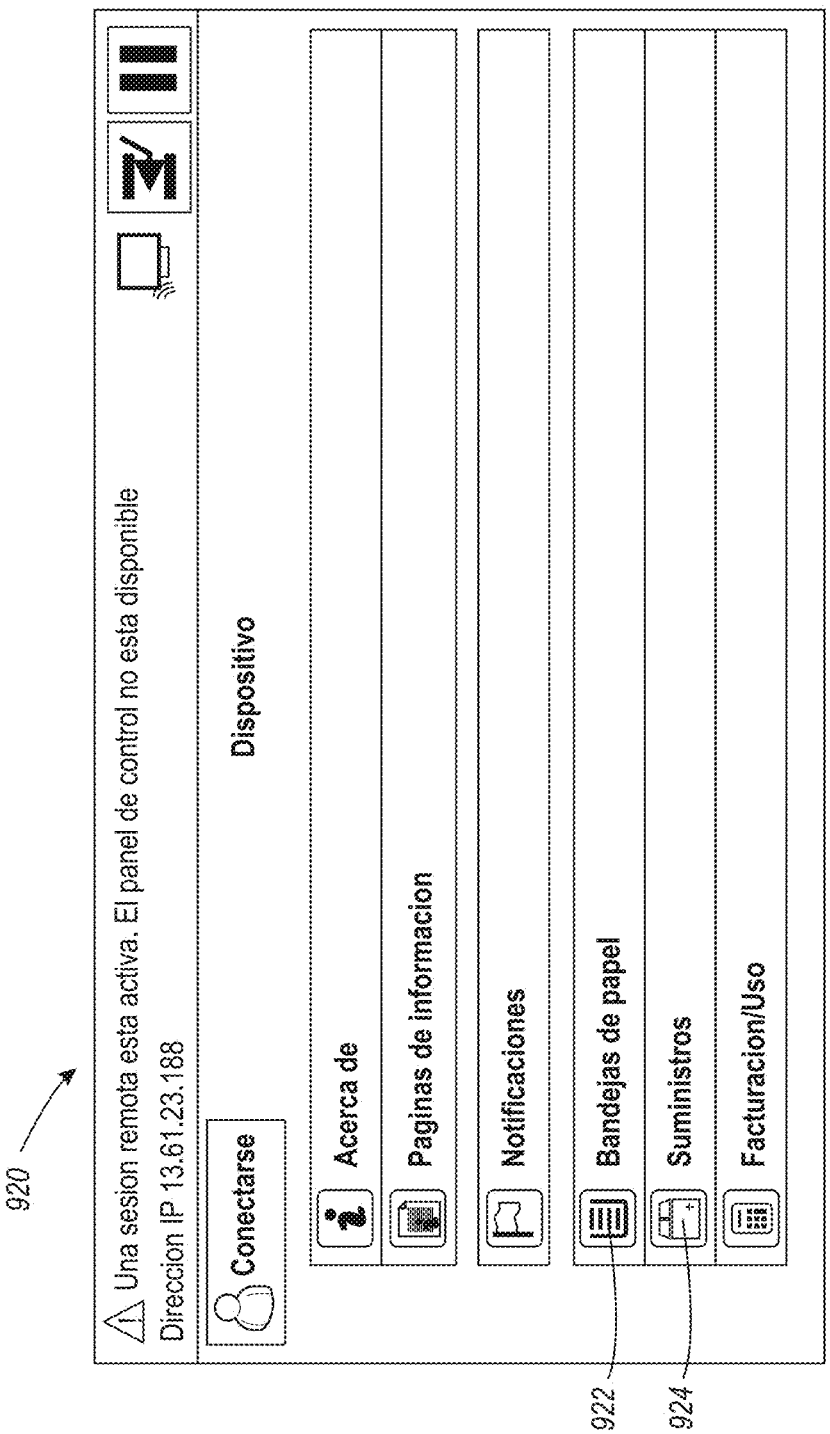

Similarly, the snapshot 900 of FIG. 9A shows screen shot of apps running on the multi-function device 202 such as app 902, and 904. The device app snapshot 900 is shown in the default English language. Upon detection of the personal storage device 216 and the local language detection, the multi-function device 202 changes the default language of the device 202. As a result, the device app is shown in the language Spanish as shown in the snapshot 920 of FIG. 9B. The snapshot 920 indicates the apps are now shown in the Spanish language such as 922 and 924.

Figure 8:
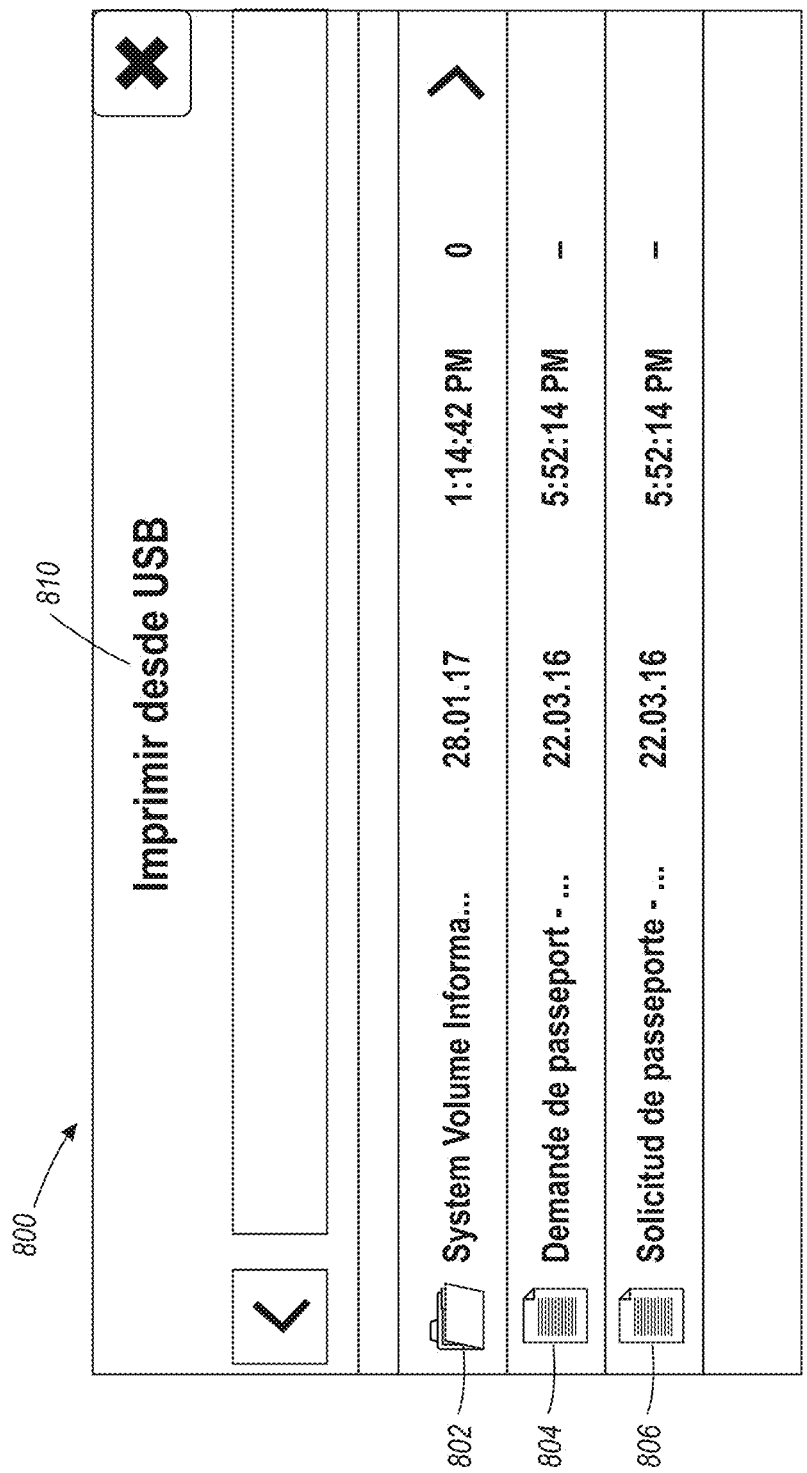

In some embodiments, if the language detection module 208 identifies more than one local language based on the name of the personal device 216 and name of each document stored in the personal device 216, then the language detection module 208 provides an option to the user to change the pre-defined language of the user interface 204. The user then selects an option and based on the user selection, the pre-defined language is changed to the local language. Once the user interface 204 is shown in the local language, the user then performs one or more functions related to printing, scanning, copying and any other function. For example, the user may want to print the documents stored in the personal device 216 of the user. The snapshot 800 of FIG. 8 shows documents 802, 804, and 806 are stored in a personal device 216 of the user and the user wishes to print these documents 802, 804 and 806. The personal device 216 has a name marked as 810. From the name of the personal device 216 and the documents 802, 804 and 806 name, it is indicated that the local language of the user is Spanish.

As an example, an option is provided to the user with one or more local languages as identified based on the name of the personal device 216 and the name of each document in the personal device 216. Referring to the example of FIG. 5 and FIG. 6, the user may be provided with an option of languages, French and Spanish. The user may select any of the displayed local languages and based on the selection, the pre-defined language is changed to the local language of the user.

The language detection module 208 runs on the operating system that helps in comparing the sentence or word patterns in the name of the personal device 216 with the local database of the multi-function device 202 such as database 210. In case, the module 208 cannot detect the language using the database 210, the operating system takes decision on redirecting the language detection module 208 to an external server for identification. This makes sure that the translation based on recognition of common words is done faster. The operating system of the multi-function device 202 also help in storing and prioritizing the fetching of the commonly used words in different languages as stored.

As shown, the memory 206 stores the electronic version of the document as well as details related to the local language of the user. The memory 206 may further include one or more language databases or may also store one or more languages. The memory may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

In cases where the identified local language is not available with the multi-function device 202 or the database 210, the multi-function device 202 contacts an external device such as, but not limited to, a server such as a web server, a data server, an external storage, a cloud system, a desktop PC, a notebook, portable computer, a workstation, a mainframe computer, an internet appliance, or the like. The multi-function device 202 contacts the server via a network. The network may be a wireless network, a wired network, or a combination thereof. The network may also be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the multi-function device and other connected devices/systems.

In some embodiments, the multi-function device 202 is fully controlled by a server (although not shown), where the server controls all the functionalities related to such as printing, scanning, copying, or the like. In the context of the current disclosure, the server performs all the functionalities related to the local language detection and upon detection, the server communicates the local language to the multi-function device 202.

Exemplary Flowchart

Typically, a multi-function device is pre-configured with a language such as English, that is location or geography dependent language. As a result, all options such as an email, fax, photocopy, print, scan or the like, are presented to the user in the pre-configured language via a user interface. For example, the multi-function device may include a user interface in English language if the machine is imported/exported/sold in countries like United States of America, United Kingdom, etc., and may or may not have the option to change the language preference. Even though if the devices have language change options, those language change options as known are not desirable and are not efficient. Thus, the method is disclosed.

Figure 3:
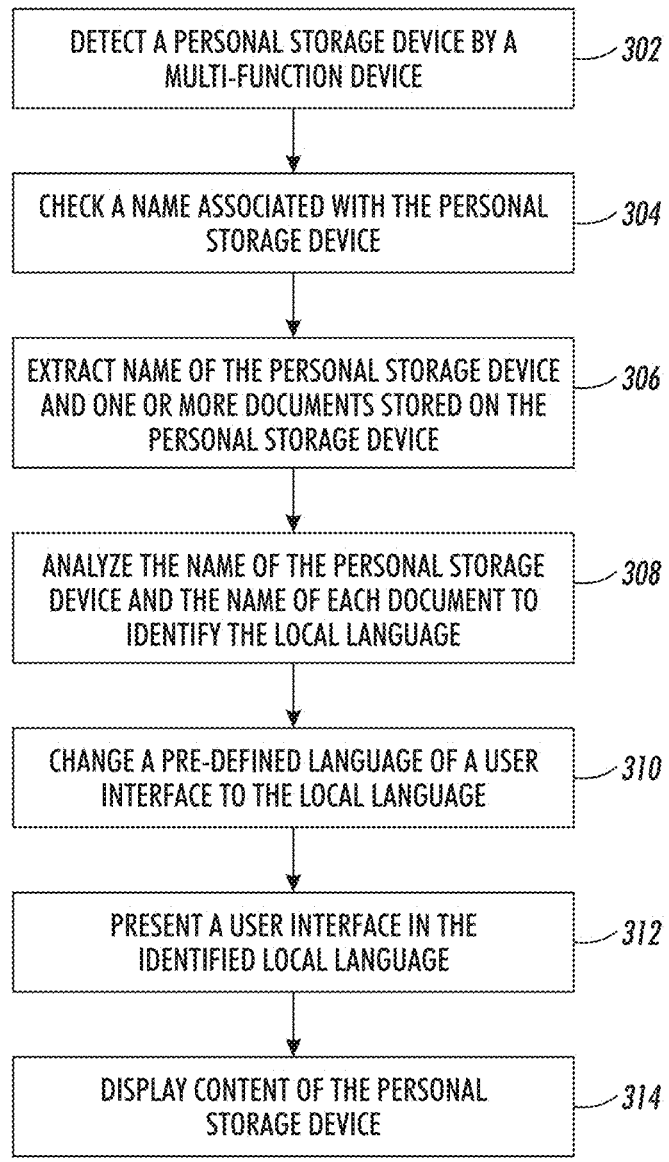
FIG. 3 shows a detailed method flowchart for localizing a user interface based on a personal device of a user.

FIG. 3 is a method flowchart for localizing a user interface of a business device such as a multi-function device. References to other figures, such as FIG. 1 or FIG. 2, can be made while discussing FIG. 3. To localize the user interface, the method takes cue from a personal storage device of a user. Various examples of the personal storage device may include, but not limited to, a USB stick, a thumb drive, a pen drive, a flash-disk, and USB memory. The personal storage device stores content of the user such as one or more documents, or any other data of the user. Typically, the personal storage device is also geography dependent and it is considered that name of the personal storage device and name of each document are in a local language of the user.

To begin with, the method starts when the user connects the personal storage device to the multi-function device. The personal storage device is connected to the multi-function device via a peripheral port such as a USB port. The personal storage device is received by the multi-function device. At 302, the personal storage device is detected by the multi-function device. It is checked if the personal storage device is associated with a name, at 304. If no name is associated with the personal storage device, then the method stops. Else, the name of the personal storage device and the name of each document are extracted, at 306. The name of the personal storage device and the name of each document are analyzed to identify a local language of the user, at 308. In particular, the name of the personal storage device and the name of each document are compared with one or more pre-stored patterns. Upon comparison, a local language of the user is identified. It is then checked if the pre-defined language is different from the identified local language. If no, the method stops. Else, the local language is retrieved and downloaded. The local language is retrieved from the multi-function device if available. In some embodiments, the local language may be retrieved from a server if the identified local language is not available with the multi-function device. Thereafter, the local language is installed on the multi-function device and the local language is configured on the multi-function device. At 310, the pre-defined language of the user interface is changed to the local language of the user. At 312, the user interface is presented in the identified local language. Accordingly, one or more menu options or sub-menu options are displayed in the identified local language of the user. At 314, content of the personal storage device is displayed after changing the pre-defined language to the local language of the user. The user is able to view the content of the personal storage device. For example, the user accesses the documents for one or more purposes such as for printing, scanning or copying or the like. In addition, the user can perform functions such as copy, scan to destination, fax, Internet Fax, server fax, change device settings, access app gallery, print by QR code or the like.

In some embodiments, the method includes identifying the local language associated with each document in personal storage device. If the local language identified with each document is same or most of the documents is same, in that case, the pre-defined language of the multi-function device is automatically changed to the local language. For example, if the personal storage device contains five documents and three documents have the same local language, i.e., Hindi, the pre-defined language is changed to the local language, i.e., Hindi. In other embodiment, if the local language associated with each document is different, then an option with those languages is provided for the user to select a single local language. Thereafter, the pre-defined language is changed to the selected single local language.

The present disclosure discloses methods and systems for localizing a user interface for business devices (e.g., multi-function devices) based on a personal storage device of a user and has many advantages associated therein. The implementation of the disclosure does not require any hardware changes to existing devices and/or systems. Further, the disclosure can be implemented for differently abled people who can change the user interface to their convenient language or the language that is known to the user. Without much interaction with the multi-function device, the disclosure allows the user to change the default language to the local language. The methods and systems provide a smart way to customize the language of the user interface of the multi-function device to improve operability. In addition, the user is not required to know the current language of the multi-function device. Additionally, without knowing or with minimal knowledge on the current language of the multi-function device, the disclosure allows the user to change the default language to the local language of the user.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "analyzing," or "detecting," or "displaying," or "recognizing," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for localizing a user interface of a multi-function device, based on a personal device of a user connected to the multi-function device, wherein the multi-function device presents a user interface in a pre-defined language, the method comprising:
   receiving the personal device by the multi-function device, the personal device stores one or more documents, the personal device is associated with a name and each document is associated with a name, wherein the name of the personal device and the name of each document indicate a local language of the user;
   upon receiving, detecting the personal device by the multi-function device;
   extracting the name of the personal device and the name of each document;
   comparing the extracted name of the personal device and the extracted name of each document with one or more pre-stored language patterns to detect the local language of the user; and
   upon comparison, automatically changing the pre-defined language of the user interface to the local language of the user.

2. The method of claim 1, wherein each document is in a different local language of the user.

3. The method of claim 1, wherein each document is in the same local language of the user.

4. The method of claim 1, wherein the personal device of the user comprises one of a Universal Serial Bus (USB) storage device, memory cards, external HDD (Hard Disk Drive), a mobile device, a personal digital assistant (PDA) and a tablet.

5. The method of claim 1, further comprising displaying content of the personal device when the pre-defined language is changed to the local language of the user.

6. The method of claim 1, further comprising displaying an option to the user to change the pre-defined language to a local language as selected by the user.

7. The method of claim 1, further comprising presenting the user interface in the local language of the user.

8. The method of claim 1, further comprising retrieving the local language from the multi-function device.

9. The method of claim 1, further comprising retrieving and downloading the local language from a server.

10. A method, comprising:
receiving a storage device by a multi-function device, wherein the multi-function device presents a user interface in a pre-defined language of the multi-function device;
detecting the storage device by the multi-function device, the storage device includes one or more documents, wherein the storage device and each document are associated with a respective name, wherein the name of the storage device and the name of each document are in a local language of a user;
extracting the name of the storage device and the name of each document;
analyzing the name of the storage device and the name of each document to detect the local language of the user using a language model;
changing the pre-defined language to the local language of the user;
displaying content of the storage device when the pre-defined language is changed to the local language of the user; and
presenting the user interface in the local language of the user to perform one or more functions.

11. The method of claim 10, wherein the one or more documents are in one or more local languages of the user.

12. The method of claim 10, further comprising comparing the extracted information with one or more pre-stored language patterns to identify the local language of the user.

13. The method of claim 10, further comprising retrieving and downloading the local language from a server.

14. The method of claim 13, further comprising automatically changing the pre-defined language to the identified local language, if language identified with each document is the local language.

15. The method of claim 11, further comprising providing an option to the user to change the pre-defined language to a local language, the local language is selected from the provided option.

16. A multi-function device, comprising:
a user interface presented, by the multi-functional device, to a user in a pre-defined language of the multi-function device;
a language database to store one or more patterns related to one or more languages and storing one or more local languages;
a peripheral port to receive a personal device of a user, the personal device is associated with a name, wherein the personal device includes one or more documents, wherein each document is associated with a name, wherein the name of the personal device and the name of each document are in a local language of a user; and
a processor triggering a language detection module to:
extract the name of the personal device and the name of each document, to detect the local language of the user; and
upon extraction, automatically change the user interface from the pre-defined language to the local language of the user.

17. The multi-function device of claim 16, wherein the multi-function device is to display content of the personal device after the pre-defined language is changed to the local language of the user.

18. The multi-function device of claim 16, wherein the language detection module is to provide an option to the user to change the pre-defined language to the local language of the user.

19. The multi-function device of claim 16, wherein the local language is retrieved from a server if the local language of the user is not available with the multi-function device.

20. The multi-function device of claim 16, wherein the language detection module is to check whether the pre-defined language of the multi-function device is different from the local language of the user.

21. The multi-function device of claim 16, wherein the language detection module is to compare the extracted information with the one or more pre-stored patterns in the language database.

* * * * *